(12) United States Patent
Bell et al.

(10) Patent No.: US 11,441,934 B2
(45) Date of Patent: Sep. 13, 2022

(54) MULTICHANNEL FLOW TUBE WITH SUPPORTS

(71) Applicant: Micro Motion, Inc., Boulder, CO (US)

(72) Inventors: Mark James Bell, Longmont, CO (US); Joel Weinstein, Boulder, CO (US); Mitalee Nayan Desai, Boulder, CO (US); Clinton R. Griffin, Erie, CO (US)

(73) Assignee: Micro Motion, Inc., Boulder, CO (US)

( * ) Notice: Subject to any disclaimer, the term of this patent is extended or adjusted under 35 U.S.C. 154(b) by 168 days.

(21) Appl. No.: 16/637,494

(22) PCT Filed: Aug. 23, 2017

(86) PCT No.: PCT/US2017/048153
§ 371 (c)(1),
(2) Date: Feb. 7, 2020

(87) PCT Pub. No.: WO2019/040055
PCT Pub. Date: Feb. 28, 2019

(65) Prior Publication Data
US 2020/0249061 A1    Aug. 6, 2020

(51) Int. Cl.
*G01F 1/84*    (2006.01)

(52) U.S. Cl.
CPC .......... *G01F 1/8404* (2013.01); *G01F 1/8409* (2013.01); *G01F 1/8468* (2013.01); *G01F 1/8477* (2013.01)

(58) Field of Classification Search
CPC .... G01F 1/8404; G01F 1/8409; G01F 1/8477; G01F 1/8486; G01F 1/8495
See application file for complete search history.

(56) References Cited

U.S. PATENT DOCUMENTS

| | | | | |
|---|---|---|---|---|
| 4,467,728 | A | * | 8/1984 | Horne ................... B29C 70/28 108/51.3 |
| 2013/0098484 | A1 | | 4/2013 | Speldrich et al. |
| 2016/0325520 | A1 | * | 11/2016 | Berger ................ B29C 69/001 |
| 2017/0069127 | A1 | * | 3/2017 | Umetani ............... B33Y 50/00 |
| 2017/0343404 | A1 | | 11/2017 | Anklin et al. |

FOREIGN PATENT DOCUMENTS

| | | |
|---|---|---|
| CN | 103900652 A | 7/2014 |
| JP | S62170819 A | 7/1987 |
| JP | 20176169749 B1 | 7/2017 |
| WO | 199416855 A1 | 8/1994 |
| WO | 2017200518 A1 | 11/2017 |

* cited by examiner

*Primary Examiner* — Erika J. Villaluna
(74) *Attorney, Agent, or Firm* — The Ollila Law Group LLC (57) ABSTRACT

A multichannel flow tube (300) for a vibratory meter (5), and a method of manufacturing the multichannel flow tube are provided. The multichannel flow tube comprises a tube perimeter wall (304), a first channel division (302b), and a first support structure (308a). The first channel division is enclosed within and coupled to the tube perimeter wall, forming a first channel (306b) and a second channel (306c). The first support structure is coupled to the tube perimeter wall and the first channel division.

25 Claims, 4 Drawing Sheets

MULTICHANNEL FLOW TUBE WITH SUPPORTS

TECHNICAL FIELD

The examples described below relate to multichannel flow tubes and methods for manufacturing multichannel flow tubes. More particularly, the examples are directed to multichannel flow tubes with supports.

TECHNICAL FIELD

Vibratory meters, such as Coriolis mass flowmeters and vibrating densitometers, typically operate by detecting motion of a vibrating flow tube that contains a flowing material. Properties associated with the material in the flow tube, such as mass flow, density and the like, can be determined by processing measurement signals received from motion transducers associated with the flow tube. Vibratory meters have meter assemblies with one or more flow tubes of a straight or curved configuration. Each flow tube configuration in a Coriolis mass flow meter, for example, has a set of natural vibration modes, which may be of simple bending, torsional, or coupled type. Each flow tube can be driven to oscillate at a preferred mode. When there is no flow through the flowmeter, a driving force applied to the flow tube(s) causes all points along the flow tube(s) to oscillate with identical phase or with a small "zero offset", which is a time delay measured at zero flow.

As material begins to flow through the flow tube(s), Coriolis forces cause each point along the flow tube(s) to have a different phase. For example, the phase at the inlet end of the flowmeter lags the phase at the centralized driver position, while the phase at the outlet leads the phase at the centralized driver position. Pickoffs on the flow tube(s) produce sinusoidal signals representative of the motion of the flow tube(s). Signals output from the pickoffs are processed to determine the time delay between the pickoffs. The time delay between the two or more pickoffs is proportional to the mass flow rate of material flowing through the flow tube(s).

A meter electronics connected to the driver generates a drive signal to operate the driver, and to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the flow tube(s) at a desired flow tube amplitude and frequency. It is also known in the art to provide the pickoffs as a magnet and coil arrangement very similar to the driver arrangement.

Entrained gas in liquid and wet gases are common application problems for Coriolis flow meters, especially in the oil and gas production industry. The particles, or gas bubbles/liquid droplets that form inside of a bulk fluid can decouple from the bulk fluid when the vibratory meter is vibrated. Additionally, velocity of sound (VOS) effects found in multiphase fluids and single phase gases can cause further measurement errors. Flow profile effects are another area of concern for all types of flow meters. When a Reynolds number is low, typically due to high viscosity of a fluid in the flow meter, there are viscosity-related effects, which can reduce the sensitivity of a flow meter. Multichannel flow tubes can help minimize these sources of flow meter errors.

Multichannel flow tubes include one or more channel divisions that divide a single flow tube into two or more channels. With the fluid contained in a channel having a smaller effective diameter, particle decoupling, VOS errors, and flow profile effects can be substantially reduced. Prior single-channel flow tube vibratory meter designs may be fitted with multichannel flow tubes to provide a vibratory meter with fewer meter measurement errors.

Multichannel flow tubes provide additional challenges to the vibratory meter designer, however. Channel divisions are often coupled to a flow tube perimeter wall along a longitudinal direction of the flow tube. Because the flow tube perimeter wall is typically driven at a drive frequency w, the oscillation can cause the connections between the channel divisions and the flow perimeter wall to weaken. This can cause multichannel flow tube damage, or failure.

The channel divisions within a multichannel flow tube also take up additional cross-sectional flow tube space, which can further restrict the fluid as it flows into the multiple channels of the conduit. This may cause a pressure drop in the fluid being measured that can affect meter measurements. To avoid this pressure drop effect, it may be preferable to minimize the width of the channel divisions themselves. Minimizing the width of the channel divisions can make it difficult to couple the channel divisions to the tube perimeter wall, however.

Accordingly, there is a need for more robust multichannel flow tubes, and flow meters incorporating them, that can accurately measure a flow rate of a fluid in view of multiphase, VOS, or flow profile effects by removing the source of the errors themselves. Such solutions can be realized with a multichannel flow tube.

SUMMARY

A multichannel flow tube is provided. The multichannel flow tube comprises a tube perimeter wall, a first channel division enclosed within and coupled to the tube perimeter wall, the first channel division and the tube perimeter wall forming a first channel and a second channel in the multichannel flow tube, and a first support structure coupled to the tube perimeter wall and the first channel division.

A method for manufacturing a multichannel flow tube is provided. The method comprises forming the tube perimeter wall, forming the first channel division, and coupling the tube perimeter wall to the first channel division with a first support structure, the first channel division and the tube perimeter wall forming the first channel and the second channel in the multichannel flow tube.

ASPECTS

According to a further aspect, the multichannel flow tube may further comprise a second support structure coupled to the tube perimeter wall and the first channel division.

According to a further aspect, the first channel division may be a substantially planar wall.

According to a further aspect, the multichannel flow tube may further comprise a second channel division enclosed by and coupled to the tube perimeter wall, the second channel division separating the second channel and a third channel in the multichannel flow tube.

According to a further aspect, the multichannel flow tube may further comprise a third support structure coupled to the tube perimeter wall and the second channel division.

According to a further aspect, the multichannel flow tube may further comprise a fourth support structure coupled to the tube perimeter wall and the second channel division.

According to a further aspect, the first channel division and the second channel division may be oriented to be substantially parallel to one another.

According to a further aspect, the first support structure may be oriented at a predetermined acute angle with respect to the first channel division towards a first adjoining tube perimeter section of the tube perimeter wall.

According to a further aspect, the second support structure may be oriented at the predetermined acute angle with respect to the first channel division towards a second adjoining tube perimeter section of the tube perimeter wall.

According to a further aspect, the predetermined angle may be between 35-50 degrees.

According to a further aspect, the predetermined angle may be 45 degrees.

According to a further aspect, the tube perimeter wall may be substantially circular.

According to a further aspect, a vibratory meter with a multichannel flow tube according to the first aspect is provided. The vibratory meter may further comprise a pickoff attached to a multichannel flow tube, and a driver coupled to the multichannel flow tube, the driver being configured to vibrate the multichannel flow tube.

According to a further aspect, the method may further comprise coupling the tube perimeter wall to the first channel division with a second support structure.

According to a further aspect, the method may further comprise forming a second channel division separating the second channel and a third channel in the multichannel flow tube.

According to a further aspect, the method may further comprise coupling the tube perimeter wall to the second channel division with a third support structure.

According to a further aspect, the method may further comprise coupling the tube perimeter wall to the second channel division with a fourth support structure.

According to a further aspect, the first channel division may be a substantially planar wall.

According to a further aspect, the first channel division and the second channel division may be oriented to be substantially parallel to one another.

According to a further aspect, the first support structure may be oriented at a predetermined acute angle with respect to the first channel division towards a first adjoining tube perimeter section of the tube perimeter wall.

According to a further aspect, the second support structure may be oriented at the predetermined acute angle with respect to the first channel division towards a second adjoining tube perimeter section of the tube perimeter wall.

According to a further aspect, the predetermined angle may be between 35-50 degrees.

According to a further aspect, the predetermined angle may be 45 degrees.

According to a further aspect, the tube perimeter wall may be substantially circular.

According to a further aspect, forming the tube perimeter wall, forming the first channel division, and coupling the first support structure to the tube perimeter wall and the first channel division may further comprise printing the tube perimeter wall, the first channel division, and the first support structure via an additive process.

According to a further aspect, coupling the first support structure to the tube perimeter wall and the first channel division with a first support structure may comprise applying a seam weld between the tube perimeter wall and the first channel division.

According to a further aspect, forming the tube perimeter wall, forming the first channel division, and coupling the first support structure to the tube perimeter wall and the first channel division may further comprise removing material between the tube perimeter wall, the first channel division, and the first support structure via a subtractive process.

BRIEF DESCRIPTION OF THE DRAWINGS

The same reference number represents the same element on all drawings. The drawings are not necessarily to scale.

DETAILED DESCRIPTION

The present Application describes vibratory meters including multichannel flow tubes, and methods of measuring a fluid with a vibratory flow meter including a multichannel flow tube.

Figure 1:
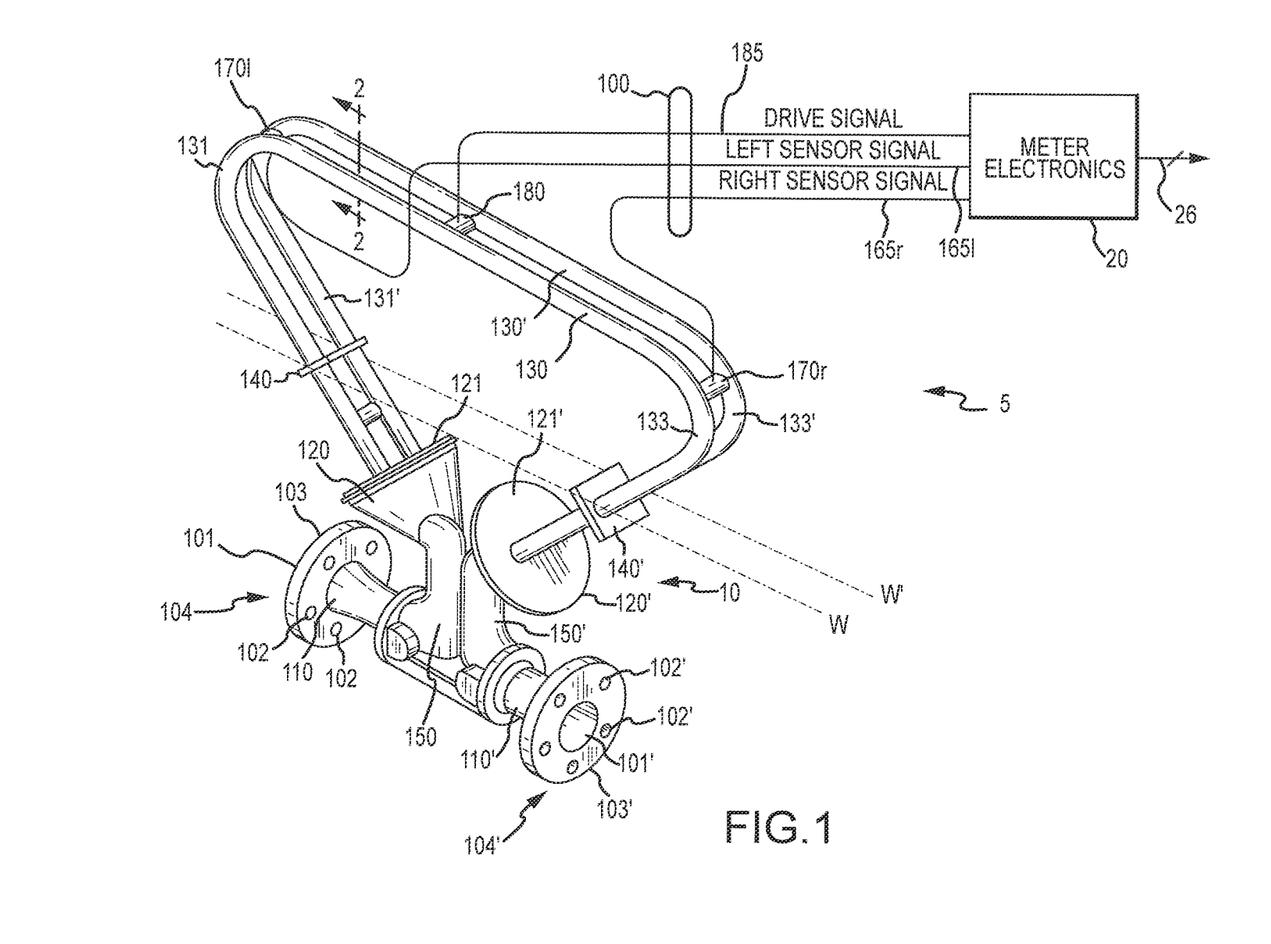
FIG. 1 depicts a vibratory flowmeter, in accordance with an example.

FIG. 1 depicts a vibratory meter 5 with a multichannel flow tube 130 in accordance with an example. As shown in FIG. 1, the vibratory meter 5 comprises a meter assembly 10 and meter electronics 20. The meter assembly 10 responds to the mass flow rate and density of a process material. The meter electronics 20 is connected to the meter assembly 10 via leads 100 to provide density, mass flow rate, and temperature information over communications path 26, as well as other information. Information and commands may be further received at meter electronics 20 over communications path 26.

A Coriolis flow meter structure is described, although this is not intended to be limiting. Those of skill will readily understand that the present Application could be practiced as a vibrating tube densitometer, tuning fork densitometer, or the like.

The meter assembly 10 includes a pair of manifolds 150 and 150', flanges 103 and 103' having flange necks 110 and 110', a pair of parallel multichannel flow tubes 130 and 130', driver 180, and a pair of pick-off sensors 170l and 170r. Multichannel flow tubes 130 and 130' have two essentially straight inlet legs 131, 131' and outlet legs 133, 133', which converge towards each other at flow tube mounting blocks 120 and 120'. The multichannel flow tubes 130, 130' bend at two symmetrical locations along their length and are essentially parallel throughout their length. Brace bars 140 and 140' serve to define the axis W and W' about which each multichannel flow tube 130, 130' oscillates. The legs 131, 131' and 133, 133' of the multichannel flow tubes 130, 130' are fixedly attached to flow tube mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the flow tube mounting block 120 having a surface 121. Within the manifold 150, the material is divided and routed through the multichannel flow tubes 130, 130'. Upon exiting the multichannel flow tubes 130, 130', the process material is recombined in a single stream within the flow tube mounting block 120' having a surface 121' and the manifold 150' and is thereafter routed to outlet end 104' connected by the flange 103' having holes 102' to the process line (not shown).

The multichannel flow tubes 130, 130' are selected and appropriately mounted to the flow tube mounting blocks 120, 120' to have substantially the same mass distribution, moments of inertia and Young's modulus about bending axes W-W and W'-W', respectively. These bending axes go through the brace bars 140, 140'.

Both multichannel flow tubes 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the multichannel flow tube 130' and an opposing coil mounted to the multichannel flow tube 130 and through which an alternating current is passed for vibrating both multichannel flow tubes 130, 130'. A suitable drive signal is applied by the meter electronics 20, via lead 185, to the driver 180.

The meter electronics 20 receives the left and right sensor signals appearing on leads 165*l*, 165*r*, respectively. The meter electronics 20 produces the drive signal appearing on lead 185 to driver 180 and vibrate multichannel flow tubes 130, 130'. The meter electronics 20 processes the left and right sensor signals and the RTD signal to compute the mass flow rate and the density of the material passing through meter assembly 10. This information, along with other information, may be transmitted by meter electronics 20 over communications path 26.

While FIG. 1 depicts a single meter assembly 10 in communication with meter electronics 20, those skilled in the art will readily appreciate that multiple sensor assemblies may be in communication with meter electronics 20. Further, meter electronics 20 may be capable of operating a variety of different sensor types. Each sensor assembly, such as the meter assembly 10 in communication with meter electronics 20, may have a dedicated section of a storage system within meter electronics 20.

Meter electronics 20 may include various other components and functions, as will be understood by those of skill. These additional features may be omitted from the description and the figures for brevity and clarity.

Vibratory meter 5 includes multichannel flow tubes 130, 130'. Multichannel flow tubes 130, 130' have a plurality of fluid channels through which a material, such as a single phase or multiphase fluid, can flow. That is, the fluid flowing through the multichannel flow tubes 130, 130' may flow through two or more fluid channels.

Figure 2:
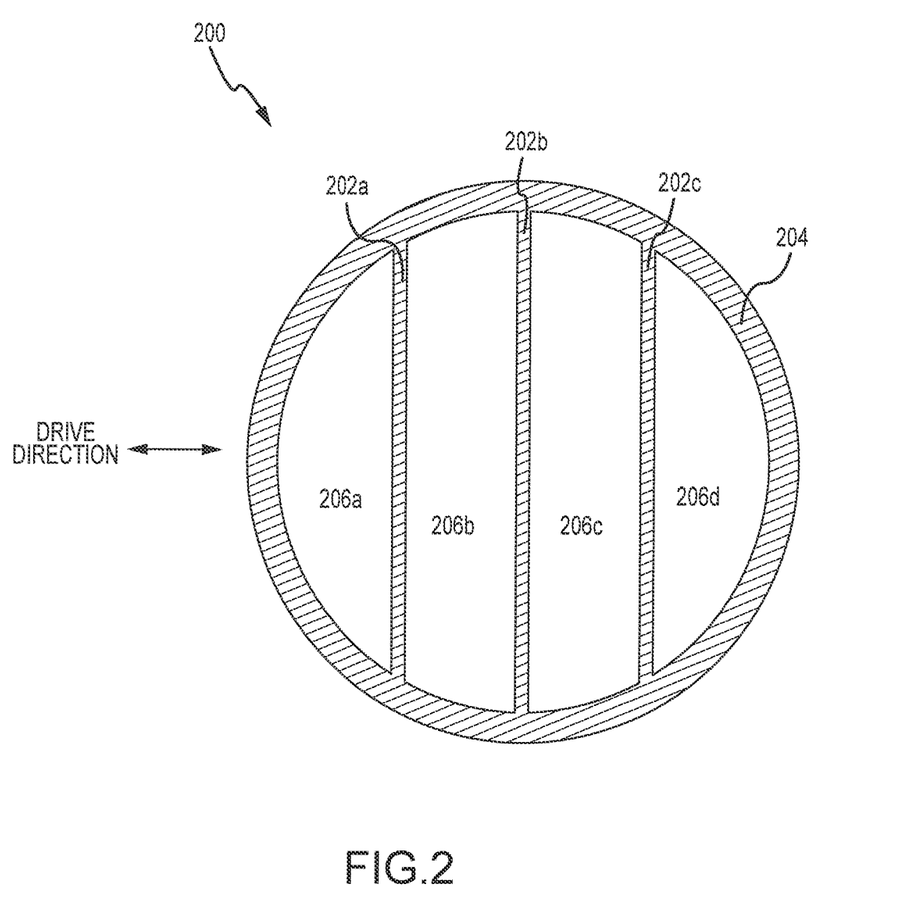
FIG. 2 depicts a cross-section of a multichannel flow tube of a vibratory flowmeter.

FIG. 2 depicts a cross section of prior multichannel flow tube 200. Multichannel flow tube 200 includes one or more channel divisions 202*a*, 202*b*, 202*c*, which are coupled to tube perimeter wall 204. The one or more channel divisions 202*a*, 202*b*, 202*c* and tube perimeter wall 204 define four example channels 206*a*, 206*b*, 206*c*, and 206*d*. For reference, the drive direction of the vibratory meter is noted on FIG. 2.

Because the drive direction is perpendicular to the longitudinal joint that connects the tube perimeter wall 204 to the channel divisions 202*a*, 202*b*, 202*c*, during operation of the vibratory meter, the joint may be strained in its weakest dimension. This may lead to channel divisions 202*a*, 202*b*, 202*c* becoming detached or damaged from the flow tube perimeter wall 204. It may additionally lead to flow tube perimeter wall 204 itself becoming damaged.

It may also be desirable to reduce the pressure drop caused by a fluid entering a multichannel section of multichannel flow tube 200 from a single channel section of the same flow tube, by making channel divisions 202*a*, 202*b*, 202*c* as thin as possible. Constructing a multichannel flow tube with relatively thin channel divisions may further create difficulties with tube fabrication, however, and it may further exacerbate the problems that may be encountered when vibrating the tube perimeter wall 204/channel division 202*a*, 202*b*, 202*c* joints.

To increase the robustness of multichannel flow tube 200, it may further be desirable to make the joints connecting the tube perimeter wall 204 to the one or more channel divisions 202*a*, 202*b*, 202*c* stronger.

Figure 3:
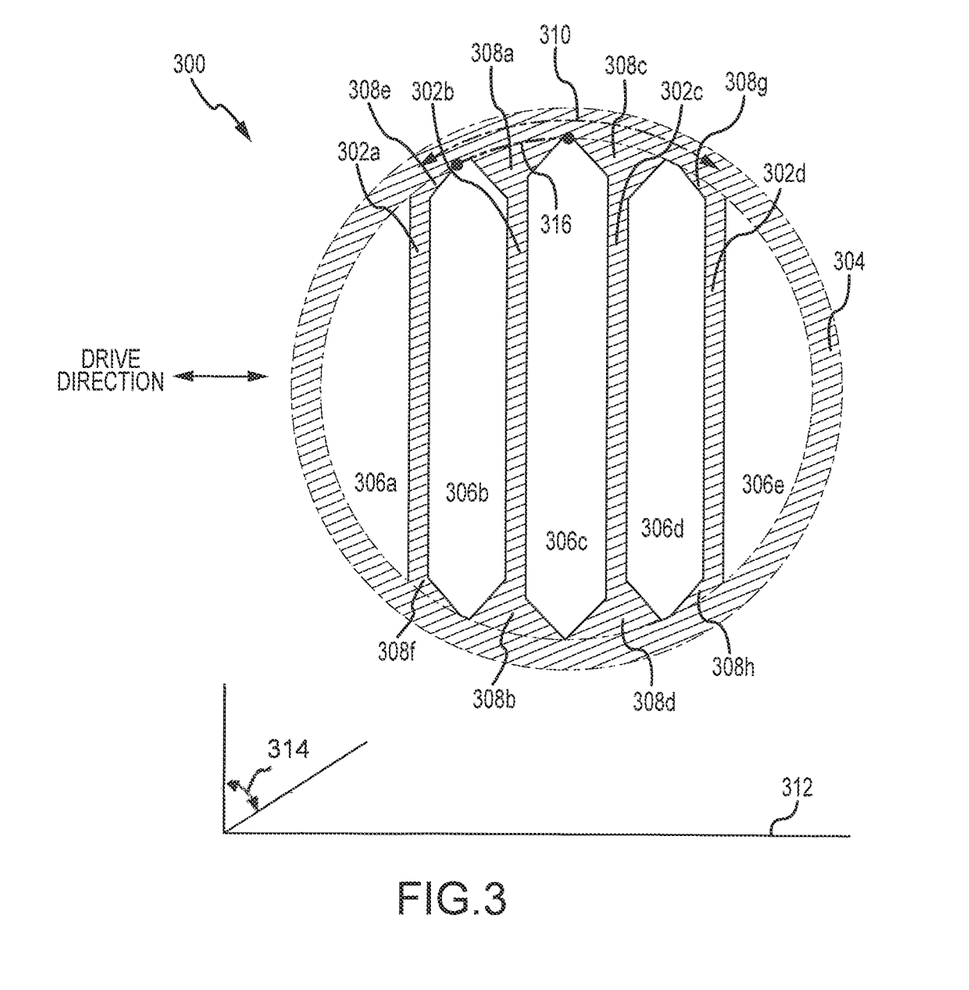
FIG. 3 depicts a cross-section of a multichannel flow tube, in accordance with an example.

FIG. 3 depicts a cross-section of example multichannel flow tube 300, according to an example. Multichannel flow tube 300 comprises two or more fluid channels 306*a*, 306*b*, 306*c*, 306*d*, and 306*e* formed by a tube perimeter wall 304 and one or more channel divisions 302*a*, 302*b*, 302*c*, and 302*d*. Multichannel flow tube 300 further includes one or more support structures 308*a*-308*h*.

Tube perimeter wall 304 encircles and contains the fluid in multichannel flow tube 300. In examples, tube perimeter wall 304 may have a uniform thickness. While FIG. 3 depicts tube perimeter wall 304 as circular, those of skill will readily understand that tube perimeter wall 304 may take any shape or form. For example, tube perimeter wall may be substantially circular, meaning it may be round, with a range of radii that are within 30% of an average radius value. Alternatively, tube perimeter wall may include a combination of curved and straight sections, or may include all straight sections.

Multichannel flow tube 300 includes a first channel division enclosed within and coupled to the tube perimeter wall. For example, the first channel division may be any one of channel divisions 302*a*, 302*b*, 302*c*, and 302*d*. A channel division may connect to two separate sections of tube perimeter wall 304, to divide fluid between two channels.

A channel division may be substantially planar, meaning that each channel division may have a substantially uniform thickness, or to vary less than 30% in thickness, and to be substantially planar in form. In further embodiments, however, the one or more channel divisions 302*a*, 302*b*, 302*c*, and 302*d* may include a curvilinear cross section, a substantially circular cross section, or any other cross section known to those of skill.

In examples, multichannel flow tube 300 may include one or more channel divisions 302*a*, 302*b*, 302*c*, and 302*d* positioned along the entire longitudinal length of the flow tube. In other examples, however, the one or more channel divisions 302*a*, 302*b*, 302*c*, and 302*d* may only extend along the vibrating region of the flow tube. In further examples, however, the channel divisions may only extend along a portion of the vibrating region of the multichannel flow tube, to balance the error reducing effects of the fluid channels with the potential pressure drop that they may cause in multichannel flow tube 300.

The first channel division and the tube perimeter wall form a first channel and a second channel in the multichannel flow tube. A channel is a cross section of multichannel flow tube 300 that includes an enclosed area that forms a sub-conduit of the main flow tube, through which fluid may flow separately from other channels. The one or more channel divisions 302*a*, 302*b*, 302*c*, and 302*d*, along with tube perimeter wall 304, define two or more channels 306a, 306b, 306c, 306d, or 306e. For example, first channel division 302a defines first channel 306a and second channel 306b. When multichannel flow tube 300 includes second channel division 302b, second channel division 302b further defines part of second channel 306b and third channel 306c. In examples, multichannel flow tube 300 may have one, or any number of channel divisions 302a, 302b, 302c, and 302d.

In the example of multichannel flow tube 300, the one or more channel divisions 302a, 302b, 302c, 302d are oriented in substantially the same direction. This is not intended to be limiting, however. In further embodiments, multichannel flow tube 300 may include one or more additional channel divisions oriented in another direction different from that of channel divisions 302a, 302b, 302c, 302d. For example, multichannel flow tube 300 may include one or more additional channel divisions oriented perpendicular to channel divisions 302a, 302b, 302c, 302d, to form a grid-type structure of channel divisions.

In examples, the first channel division and the second channel division may be oriented to be substantially parallel to one another.

In examples, a channel division may be formed from a sheet of metal, by extrusion, via subtractive manufacturing techniques, such as machining, electrical discharge machining, electrochemical machining, electron beam machining, photochemical machining, and ultrasonic machining, or via additive manufacturing or three-dimensional (3D) printing techniques, such as stereolithography, digital light processing, fused deposition modeling, selective laser sintering, selective laser melting, electronic beam melting, or laminated object manufacturing.

Multichannel flow tube 300 includes a first support structure coupled to the tube perimeter wall and the first channel division. For example, channel division 302b includes a support structure 308a. A support structure is a structure that helps to couple, and/or fortify a joint between a channel division 302a, 302b, 302c, 302d and the tube perimeter wall 304. A support structure comprises additional material positioned on at least one side of a channel wall, coupled to both the channel division 302a, 302b, 302c, 302d and the tube perimeter wall 304.

In examples, additional support structures may be coupled to the tube perimeter wall and one or more channel divisions 302a, 302b, 302c, 302d. For example, a second support structure 308b may be coupled to the tube perimeter wall and the first channel division 302b, a third support structure 308c may be coupled to the tube perimeter wall and the second channel division 302c, and a fourth support structure 308d may be coupled to the tube perimeter wall and the second channel division 302c. As those of skill will readily understand, there may be additional support structures 308e, 308f, 308g, 308h, coupled to further channel supports 302a, 302d.

A support structure may provide additional support to one or two sides of a joint. For example, support structures 308a, 308b, 308c, and 308d include support on both sides of the respective channel division/tube perimeter wall joint. In further examples, however, a support structure may provide additional support to only one side of a joint. For example, support structures 308e, 308f, 308g, and 308h include support on only one side of the respective channel division/tube perimeter wall joint that they reinforce. Providing support structures may allow a vibratory flow meter to feature the advantages of a multichannel flow tube, with a robust design that provides a longer life over prior designs, and that is less likely to experience failure.

In examples, as depicted in FIG. 3, the portions of support structures 308a-308h that are not coupled to tube perimeter wall 304 or a channel division 302a, 302b, 302c, 302d may be substantially straight. In further examples, however, the portions of support structures 308a-308h that are not coupled to tube perimeter wall 304 or a channel division 302a, 302b, 302c, 302d may be curved, or take any other form known to those of skill in the art.

In examples, support structures 308a-308h may be formed by seam welding channel divisions 302a, 302b, 302c, 302d to tube perimeter wall 304. In further examples, support structures 308a-308h may be extruded in an integrated body with channel divisions 302a, 302b, 302c, 302d and tube perimeter wall 304. In further examples, support structures 308a-308h, channel divisions 302a, 302b, 302c, 302d and tube perimeter wall 304 may be machined via subtractive techniques. In other examples, support structures 308a-308h, channel divisions 302a, 302b, 302c, 302d and tube perimeter wall 304 may be printed via additive manufacturing techniques.

In the example of 3D printing, support structures 308a-308h may be printed in integrated layers parallel to the printer bed, in an integrated piece that includes the channel divisions 302a, 302b, 302c, 302d and tube perimeter wall 304. In the case where a 3D printer bed is oriented parallel to the plane 312, as indicated on FIG. 3, channel divisions 302a, 302b, 302c, 302d are trivial to fabricate because they are perpendicular to the printer bed. Sections of tube perimeter wall 304 that are oriented at less than a predetermined acute angle with respect to the printer bed, however, may be difficult to print without additional support materials. An example predetermined acute angle 314 is depicted in FIG. 3. For example, each portion of upper section 310 of tube perimeter wall 304 is oriented at an angle that is less than a predetermined acute angle 314 with respect to the printer bed, and will require additional supports to print. Support structures 308a-308h may therefore allow for the three-dimensional printing of multichannel flow tube 300 without additional support material that may need to be subsequently removed.

3D printing multichannel flow tube 300 further provides for an integrated tube perimeter wall 304, channel division 302a, 302b, 302c, 302d, and support structures 308a-308h. This may further increase the strength and robustness of multichannel flow tube 300 over traditional manufacturing techniques, such as welding.

In examples, the predetermined acute angle 314 may be 45 degrees. In further examples, however, the predetermined acute angle may be between 35 to 50 degrees, between 10 to 50 degrees, or 25 degrees or greater.

In examples, a first support structure may be oriented at a predetermined acute angle with respect to the first channel division towards a first adjoining tube perimeter section of the tube perimeter wall. An adjoining tube perimeter section is the portion of the tube perimeter wall 304 to which a support structure 308a-308h is coupled. For example, support structure 308a is coupled to first adjoining tube perimeter section 316 on two sides of channel division 302b. Both sides of support structure 308a are oriented at predetermined acute angle 314. Example support structure 308a provides a vault-shaped cross section.

In examples, the second support structure may be oriented at the predetermined acute angle with respect to the first channel division towards a second adjoining tube perimeter section of the tube perimeter wall. For example, support structure 308b is oriented at predetermined acute angle 314 with respect to channel division 302b and tube perimeter wall 304. This may further secure the coupling between channel division 302b and tube perimeter wall 304.

In examples, it may be practical to manufacture the multichannel flow tube by 3D printing the flow tube in two portions which can be subsequently coupled together. Each multichannel flow tube portion may comprise a half portion of multichannel flow tube 300, bisected in a plane parallel to plane 312, printed with the channel divisions 302a, 302b, 302c, 302d positioned directly on the printer bed. Printing the multichannel flow tube in two portions, and providing a second support structure with respect to the first channel division, may therefore alleviate the need for three-dimensional printing supports exterior to multichannel flow tube 300. This may mean less material is wasted in manufacturing, because the support structures that reinforce the channel division/tube perimeter wall joints also serve as supports for 3D printing.

Multichannel flow tube 300 may allow prior vibratory meters to be retrofitted with strong, supported multichannel flow tubes to gain the advantages of less multiphase fluid decoupling, VOS errors, and flow profile effect errors, without the disadvantages that would be provided by a flow tube with weak joints.

Figure 4:
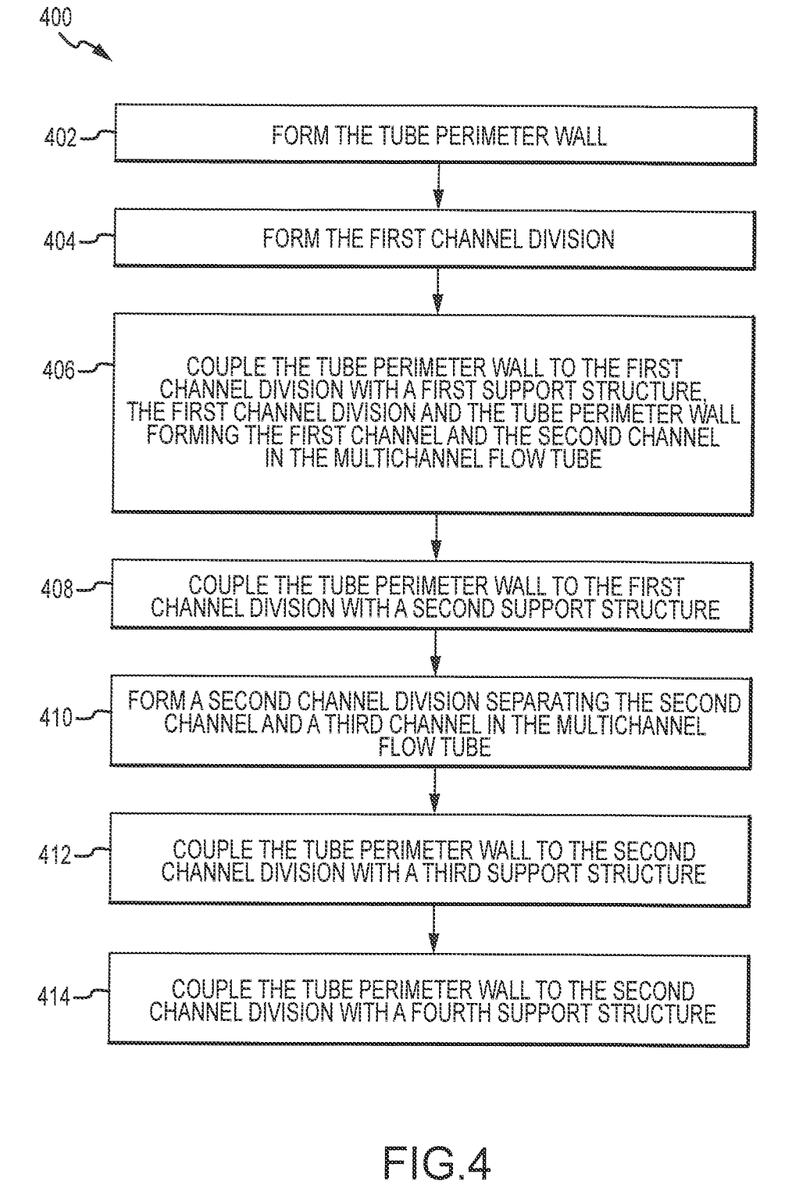
FIG. 4 depicts a method, in accordance with an example.

FIG. 4 depicts method 400, in accordance with an example. Method 400 may be executed to manufacture a multichannel flow tube. Method 400 begins with step 402. In step 402, the tube perimeter wall is formed.

In examples, the tube perimeter wall may be substantially circular.

In examples, tube perimeter wall 304 may be formed over a mandrel and seam welded, via an extrusion process, via a subtractive manufacturing process, or via an additive process.

Method 400 continues with step 404. In step 404, the first channel division is formed.

In examples, first channel division may be cut from a metal sheet, or formed via an extrusion process, a subtractive manufacturing process, or an additive process.

Method 400 continues with step 406. In step 406, the tube perimeter wall is coupled to the first channel division with a first support structure, the first channel division and the tube perimeter wall forming the first channel and the second channel in the multichannel flow tube.

For example, the tube perimeter wall may be coupled to the first channel division via seam weld channels, which may form the first support structure. In further examples, the first support structure may be extruded, machined, or printed concurrently with the channel divisions and tube perimeter wall, as described above.

In examples, method 400 may further include any of steps 408 to 414.

Method 400 may continue with step 408. In step 408, the tube perimeter wall may be coupled to the first channel division with a second support structure. Step 408 is similar to step 406, except that it relates to a second support structure.

Method 400 may continue with step 410. In step 410, a second channel division may be formed to separate the second channel and a third channel in the multichannel flow tube. Step 410 is similar to step 404.

Method 400 may continue with step 412. In step 412, the tube perimeter wall may be coupled to the second channel division with a third support structure. Step 412 is similar to step 406.

Method 400 may continue with step 414. In step 414, the tube perimeter wall may be coupled to the second channel division with a fourth support structure. Step 414 is similar to step 406.

In examples, the first channel division may be a substantially planar wall, as described above.

In examples, the first channel division and the second channel division may be oriented to be substantially parallel to one another, as described above.

In examples, the first support structure may be oriented at a predetermined acute angle with respect to the first channel division towards a first adjoining tube perimeter section of the tube perimeter wall, as described above.

In examples, the second support structure may be oriented at the predetermined acute angle with respect to the first channel division towards a second adjoining tube perimeter section of the tube perimeter wall, as described above.

In examples, the predetermined angle may be 35-50 degrees.

In examples, the predetermined angle may be 45 degrees.

In examples, forming the tube perimeter wall, forming the first channel division, and coupling the first support structure to the tube perimeter wall and the first channel division further may comprise printing the tube perimeter wall, the first channel division, and the first support structure via an additive process.

In examples, coupling the first support structure to the tube perimeter wall and the first channel division with a first support structure may comprise applying a seam weld between the tube perimeter wall and the first channel division.

In examples, forming the tube perimeter wall, forming the first channel division, and coupling the first support structure to the tube perimeter wall and the first channel division may further comprise removing material between the tube perimeter wall, the first channel division, and the first support structure via a subtractive process.

Method 400 may provide for all the performance advantages that a multichannel flow tube offers, with a more robust construction and lifespan over prior designs.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A multichannel flow tube (300) printed via a 3D printer, the multichannel flow tube comprising:
  a tube perimeter wall (304);
  a first channel division (302b) enclosed within and coupled to the tube perimeter wall, the first channel division and the tube perimeter wall forming a first channel (306b) and a second channel (306c) in the multichannel flow tube; and
  a first support structure (308a) coupled to the tube perimeter wall and the first channel division, wherein the first support structure includes a straight edge oriented at a predetermined acute angle (314) or less with respect to the first channel division towards a first adjoining tube perimeter section (310) of the tube perimeter wall, the predetermined acute angle (314) being a maximum angle printable on the 3D printer with respect to a normal of a printer bed of the 3D printer without support material.

2. A multichannel flow tube as claimed in claim 1, further comprising:
a second support structure (308b) coupled to the tube perimeter wall and the first channel division.

3. A multichannel flow tube as claimed in claim 1, wherein the first channel division is a substantially planar wall.

4. A multichannel flow tube as claimed in claim 1, further comprising:
a second channel division (302c) enclosed by and coupled to the tube perimeter wall, the second channel division separating the second channel (306c) and a third channel (306d) in the multichannel flow tube.

5. A multichannel flow tube as claimed in claim 4, further comprising:
a third support structure (308c) coupled to the tube perimeter wall and the second channel division.

6. A multichannel flow tube as claimed in claim 5, further comprising:
a fourth support structure (308d) coupled to the tube perimeter wall and the second channel division.

7. A multichannel flow tube as claimed in claim 4, wherein the first channel division and the second channel division are oriented to be substantially parallel to one another.

8. A multichannel flow tube as claimed in claim 1 further comprising a second support structure (308b) coupled to the tube perimeter wall and the first channel division, wherein the second support structure is oriented at the predetermined acute angle or less with respect to the first channel division towards a second adjoining tube perimeter section of the tube perimeter wall.

9. A multichannel flow tube as claimed in claim 1, wherein the predetermined angle is between 35-50 degrees.

10. A multichannel flow tube as claimed in claim 1, wherein the predetermined angle is 45 degrees.

11. A multichannel flow tube as claimed in claim 1, wherein the tube perimeter wall is substantially circular.

12. A vibratory meter (5) printed via a 3D printer, a multichannel flow tube comprising:
a pickoff (170l, 170r) attached to a multichannel flow tube;
a driver (180) coupled to the multichannel flow tube, the driver being configured to vibrate the multichannel flow tube; and
the multichannel flow tube (300) further comprising:
a tube perimeter wall (304),
a first channel division (302b) enclosed within and coupled to the tube perimeter wall, the first channel division and the tube perimeter wall forming a first channel (306b) and a second channel (306c) in the multichannel flow tube, and
a first support structure (308a) coupled to the tube perimeter wall and the first channel division, wherein the first support structure includes a straight edge oriented at a predetermined acute angle (314) or less with respect to the first channel division towards a first adjoining tube perimeter section (310) of the tube perimeter wall, the predetermined acute angle (314) being a maximum angle printable on the 3D printer with respect to a normal of a printer bed of the 3D printer without support material.

13. A method for manufacturing a multichannel flow tube via a 3D printer, the method comprising:
forming a tube perimeter wall;
forming a first channel division; and
coupling the tube perimeter wall to the first channel division with a first support structure, the first channel division and the tube perimeter wall forming a first channel and a second channel in the multichannel flow tube, wherein the first support structure includes a straight edge oriented at a predetermined acute angle (314) or less with respect to the first channel division towards a first adjoining tube perimeter section (310) of the tube perimeter wall, the predetermined acute angle (314) being a maximum angle printable on the 3D printer with respect to a normal of a printer bed of the 3D printer without support material.

14. A method as claimed in claim 13, further comprising:
coupling the tube perimeter wall to the first channel division with a second support structure.

15. A method as claimed in claim 13, further comprising:
forming a second channel division separating the second channel and a third channel in the multichannel flow tube.

16. A method as claimed in claim 15, further comprising:
coupling the tube perimeter wall to the second channel division with a third support structure.

17. A method as claimed in claim 16, further comprising:
coupling the tube perimeter wall to the second channel division with a fourth support structure.

18. A method as claimed in claim 13, wherein the first channel division is a substantially planar wall.

19. A method as claimed in claim 13, wherein the first channel division and the second channel division are oriented to be substantially parallel to one another.

20. A method as claimed in claim 13, further comprising a second support structure (308b) coupled to the tube perimeter wall and the first channel division, wherein the second support structure is oriented at the predetermined acute angle or less with respect to the first channel division towards a second adjoining tube perimeter section of the tube perimeter wall.

21. A method as claimed in claim 13, wherein the predetermined angle is between 35-50 degrees.

22. A method as claimed in claim 13, wherein the predetermined angle is 45 degrees.

23. A method as claimed in claim 13, wherein the tube perimeter wall is substantially circular.

24. A method as claimed in claim 13, wherein forming the tube perimeter wall, forming the first channel division, and coupling the first support structure to the tube perimeter wall and the first channel division further comprises printing the tube perimeter wall, the first channel division, and the first support structure via an additive process.

25. A method as claimed in claim 13, wherein forming the tube perimeter wall, forming the first channel division, and coupling the first support structure to the tube perimeter wall and the first channel division further comprises removing material between the tube perimeter wall, the first channel division, and the first support structure via a subtractive process.

* * * * *